H. J. LEBHERZ.
BOTTLE CAPPER.
APPLICATION FILED DEC. 31, 1921.
Reissued Feb. 14, 1922. 15,285.
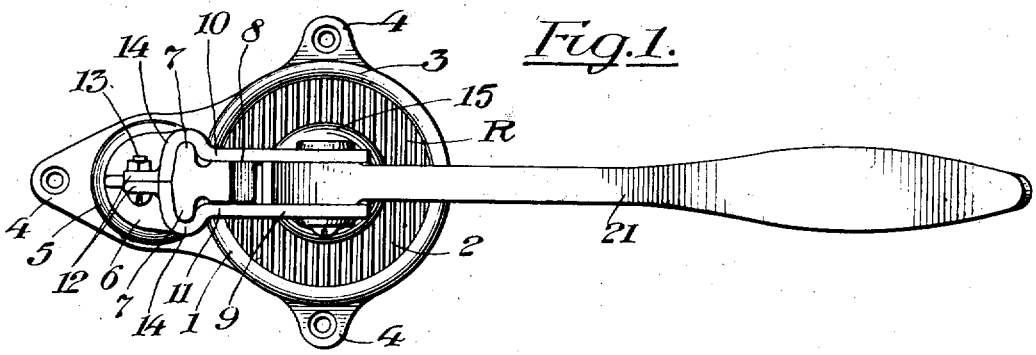
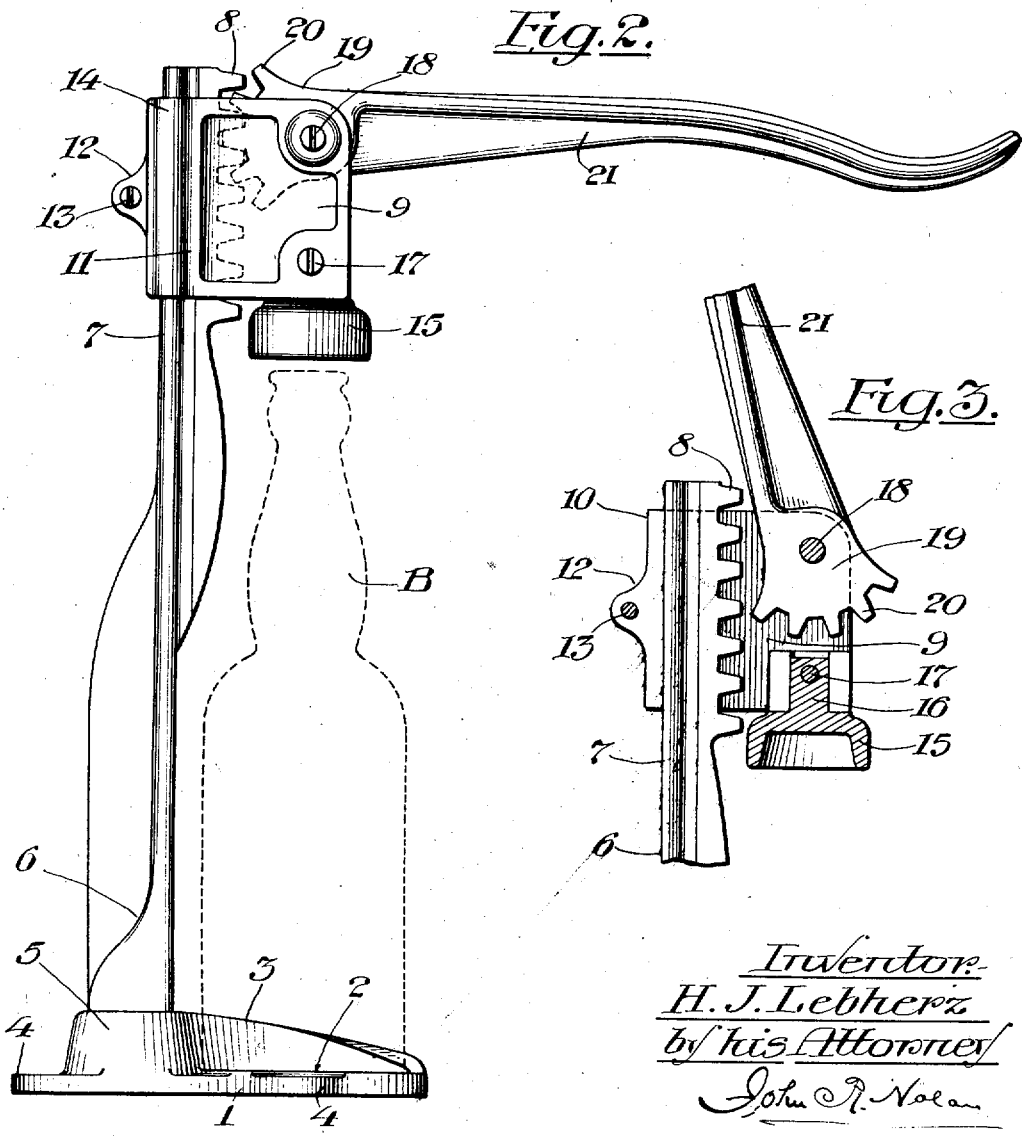
Inventor:
H. J. Lebherz
by his Attorney
John R. Nolan

UNITED STATES PATENT OFFICE.

HARRY J. LEBHERZ, OF FREDERICK, MARYLAND.

BOTTLE CAPPER.

15,285. Specification of Letters Patent. Patented Feb. 14, 1922.

Original No. 1,356,161, dated October 19, 1920, Serial No. 377,521, filed April 29, 1920. Application for reissue filed December 31, 1921. Serial No. 526,363.

*To all whom it may concern:*

Be it known that I, HARRY J. LEBHERZ, a citizen of the United States, residing at Frederick, in the county of Frederick and State of Maryland, have invented a new and useful Bottle-Capper, of which the following is a specification.

The object of my invention is to provide an improved bottle capper of such construction as to permit of its being quickly adjusted to cap bottles of different heights, and having relatively few parts and so arranged as to be effective in operation, inexpensive to manufacture, not easy to get out of order, and capable of being folded in a compact form for purposes of shipment. I attain the objects of my invention by the mechanism illustrated in the accompanying drawings, in which—

Figure 1 is a top plan of the invention;

Fig. 2 is a side elevation of same, with the bottle shown in dotted lines; and

Fig. 3 is a detail vertical section, partly in elevation, showing the means for adjusting the capper to bottles of different heights.

Like numerals designate like parts in each of the several views.

Referring to the accompanying drawings, I provide a suitable base 1, having a suitable bottle holding portion 2, preferably shaped as shown, and having a curved rib 3 of suitable shape to aid in positioning the bottle on portion 2, said rib 3 being integral with the boss 5, on which is mounted or to which is affixed the standard 6. Base 1 is provided with a plurality of suitable perforated extensions or ears 4, through which screws or nails may be driven to secure the device to any suitable table or stand.

Standard 6 is provided with suitable opposite vertically extending lateral ribs 7, around which the curved portions 14 of the plates 9 slidably engage. Plates 9 are suitably secured together as by bolts 13 and 17, ears 12 being provided to receive the bolt 13, as shown in Fig. 2. I provide a suitable chambered capper member 15, having a shank 16, through which the bolt 17 extends to secure it firmly in place between plates 9, the inner portions of plates 9 being shaped substantially as shown in Fig. 3 to receive the shank 16 in the manner shown. I provide a suitable handle 21, having its head 19 swingably mounted between plates 9 on the pivot 18, said pivot 18 being spaced sufficiently distant from the rack 8 of standard 6 so that the teeth 20 of head 19, which are of suitable size and shape to mesh with the teeth of rack 8, may be thrown entirely out of engagement with the teeth of rack 8, by swinging the handle 21 to or past a vertical position, thus permitting of readily adjusting the position of the bottle capping mechanism relative to the base 1, by merely lifting or lowering handle 21 and the attached parts to permit of the teeth 20 of head 19 being swung into engagement with the teeth of rack 8 at such point as is desired to bring the capper 15 to the appropriate height for capping a particular bottle, or to adjust it to a different height.

In operation, a bottle is placed on base 1, as shown in Fig. 2, and the cap to be applied to the bottle is forced firmly onto the mouth of the bottle by capper 15, as handle 21 is swung downward, the teeth 20 meshing with the teeth of rack 8, and the curved portions 14 of plates 9 slidably engaging the ribs 7 of standard 6 to guide the plates 9 and to cause the capper 15 to descend vertically. By tilting handle 21 to or past a vertical position, as shown in Fig. 3 the teeth 20 may be thrown out of mesh with the teeth of rack 8 and the height of the capper thus adjusted before the handle is lowered to cause the teeth to mesh and throw the device into operative position. In a like manner the parts attached to handle 21 may be entirely withdrawn from standard 6, and reinserted thereon in reversed position, with the back of handle 21 close to standard 6, to permit of shipping the device in compact disassembled but associated relation.

What I claim is:

1. In a bottle capper, the combination of a base shaped to receive and hold a bottle, a standard mounted on the base and having a rack portion, plate guiding means on said standard, guide plates engaging said plate guiding means, a capper secured to said plates, a handle pivotally mounted between said plates, and a segmental toothed head on the handle adapted to be thrown into and out of engagement with the rack to adjust the operative position of the capper, the teeth being of suitable size to mesh with the teeth of the above described rack.

2. In a bottle capper, the combination of a base shaped to receive a bottle, a standard affixed to the base, the standard having vertical laterally-projecting ribs, plates shaped to engage around the ribbed portion of the standard and slidably mounted on same, a rack on the upper end of the standard, a handle pivotally mounted between the plates, a segmental toothed head on the handle adapted to be thrown into and out of engagement with the rack to adjust the operative position of the capper, the teeth thereof being adapted to mesh with the teeth of the rack, and the head being of such size and pivoted at such position as to permit of the teeth of the head being swung entirely free from the teeth of the rack to permit of adjusting the device to cap bottles of different heights, and a capper member rigidly secured to the plates.

3. In a bottle capper, the combination of a base shaped to receive the bottle, means for attaching the base to a table, a curved rib on the base to guide the bottle in place, a standard mounted on the base, guiding ribs on the standard, a rack on the standard, guiding plates engaging about the ribbed portion of the standard, a handle pivotally mounted on the plates, said handle having a segmental toothed head the teeth of which are adapted to mesh with the teeth of the rack, the teeth being of such disposition and number as to permit of their being swung free from the rack when the handle is moved to or past a vertical position, and a capper member rigidly attached to the plates.

4. In a bottle capper, the combination of a base shaped to receive and hold a bottle, a laterally ribbed standard mounted on the base and having a rack portion, guide plates engaging the standard and vertically slidable on the standard, a capper secured to said guide plates, a handle pivotally mounted on the guide plates, said handle having a segmental toothed head, the teeth being adapted to mesh with the teeth of the rack portion of the standard when the handle is in operative position and arranged to clear said rack when the handle is moved to or past a vertical position whereby to quickly adjust the operative position of the capper, without complicated adjusting means.

5. A bottle capper comprising a base, a standard thereon having a rack portion spaced from the base, a vertically slidable element adapted to be mounted on the standard, said element when in upright position on the standard extending forwardly of the rack portion and including a depending capping member, and a lever fulcrumed on said extension above the capping member and comprising an outwardly extending operating handle and a segmental toothed head, the teeth of said head being movable through an arc within the extension and being of such disposition and number as to be out of engaging relation with the teeth of the rack portion when the handle is in up-standing position, but meshing with the teeth of the rack portion when the handle is swung forward and downward, the said element and its capping member when the handle is in up-standing position being quickly movable longitudinally of the rack portion to a predetermined operative position for capping, and being also readily removable from the top of the rack portion and reversely mountable thereon with the handle extending downward and longitudinally of the rack portion for convenience of packing and transportation.

HARRY J. LEBHERZ.